United States Patent [19]

Egoshi

[11] Patent Number: 5,870,403
[45] Date of Patent: Feb. 9, 1999

[54] APPARATUS AND A METHOD FOR ESTABLISHING SIGNAL SYNCHRONIZATION BETWEEN LINES

[75] Inventor: Hiroya Egoshi, Kawasaki, Japan

[73] Assignee: Fujitsu Limited, Kanagawa, Japan

[21] Appl. No.: 712,319

[22] Filed: Sep. 11, 1996

[30] Foreign Application Priority Data

May 30, 1996 [JP] Japan .................................. 8-136940

[51] Int. Cl.[6] ......................................................... H04L 1/22
[52] U.S. Cl. ........................................... 370/503; 370/228
[58] Field of Search .................................... 370/503, 504, 370/505, 512, 513, 514, 222, 223, 224, 225, 228, 218, 219, 227, 517; 375/372

[56] References Cited

U.S. PATENT DOCUMENTS

| | | | |
|---|---|---|---|
| 5,091,907 | 2/1992 | Wettengel | 370/505 |
| 5,335,225 | 8/1994 | Itino | 370/503 |
| 5,343,464 | 8/1994 | Itino et al. | 370/227 |
| 5,361,263 | 11/1994 | Urbansky | 370/505 |
| 5,677,931 | 10/1997 | Okuyama et al. | 370/227 |

FOREIGN PATENT DOCUMENTS

| | | |
|---|---|---|
| 5-83230 | 4/1993 | Japan . |
| 5-153103 | 6/1993 | Japan . |

*Primary Examiner*—Chi H. Pham
*Assistant Examiner*—Frank Duong
*Attorney, Agent, or Firm*—Helfgott & Karas, P.C.

[57] ABSTRACT

An apparatus for establishing synchronization between transmission signals transmitted from a signal source of a sending end to a receiving end via regular and alternative lines in a network using a transmission system such as the SDH and SONET. In the sending end, the present invention inserts a FP signal in the multiplexed information of the signal output from the signal source. On both regular- and alternative-line sides of the receiving end, it detects the pointer in the transmission signals received from the respective lines, separates the multiplexed information from the transmission signal based on the pointer, stores the separated multiplexed information in a memory unit which is capable of varying its storage capacity as specified and reading out the information when a time corresponding to the storage capacity has elapsed after the information is stored, outputs a detection signal when the FP signal is detected in the multiplexed information output from the memory unit, and specifies the storage capacity of at least one of the memory units so that the detection signals occur at the same time.

18 Claims, 10 Drawing Sheets

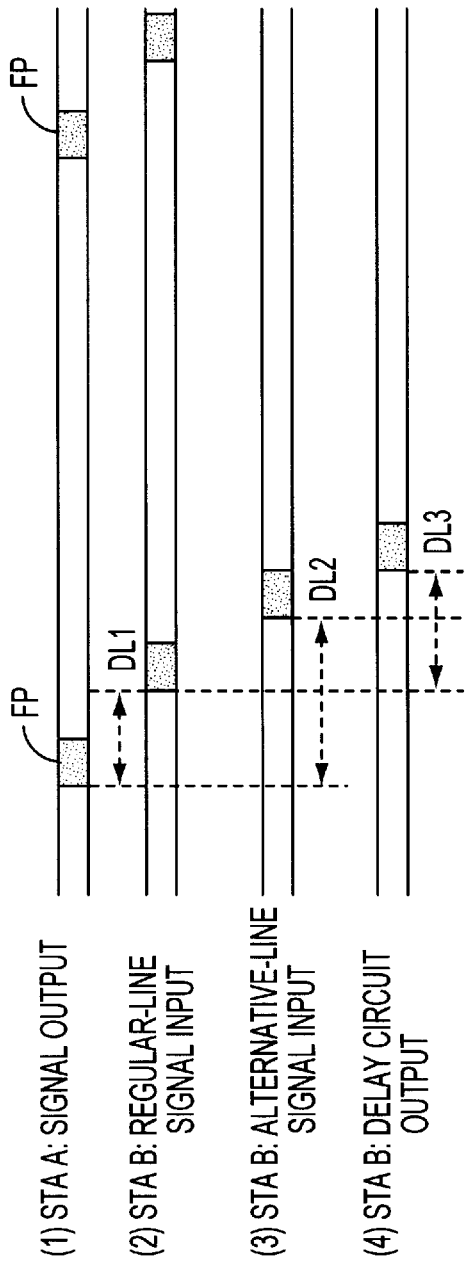

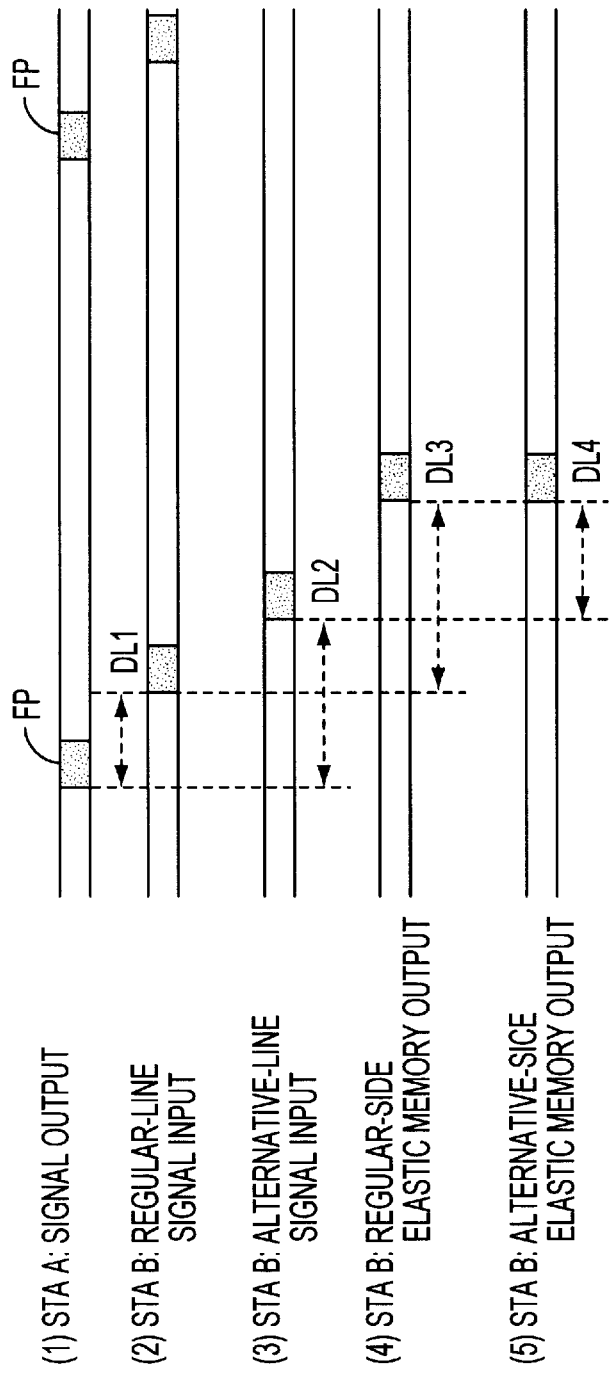

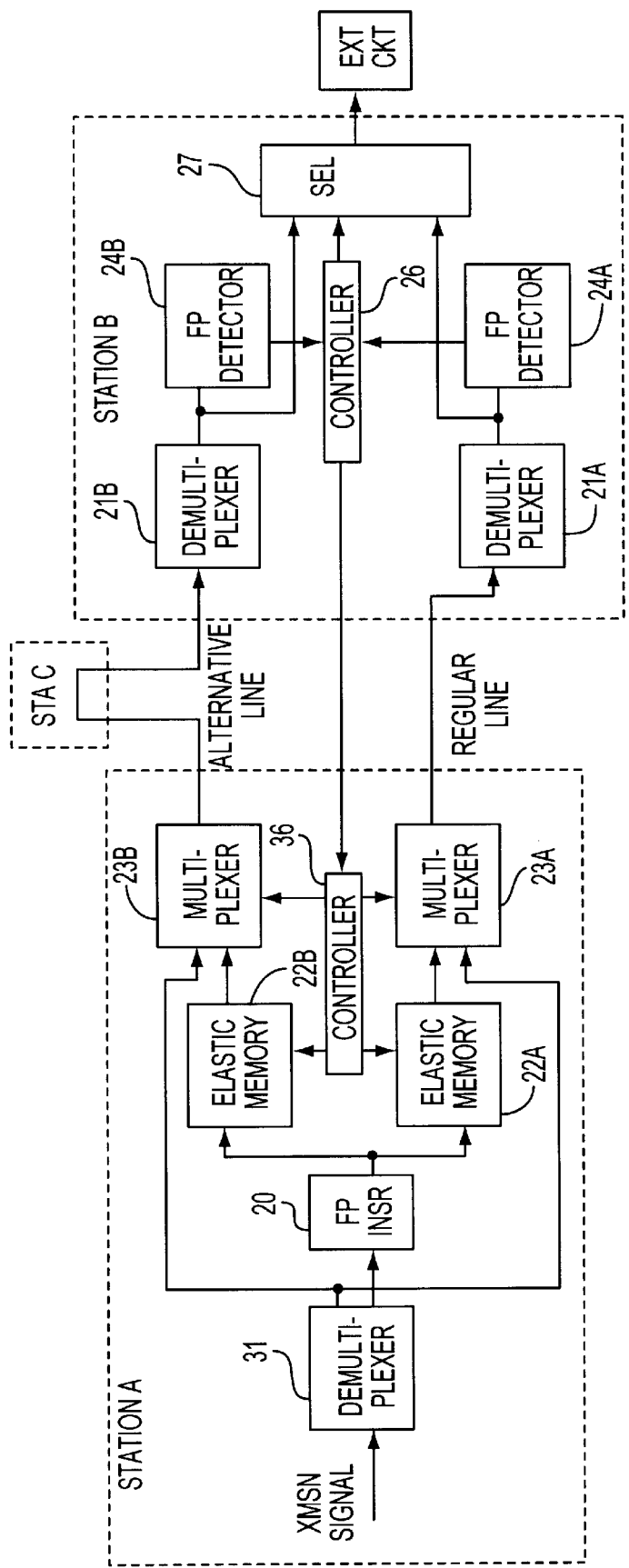

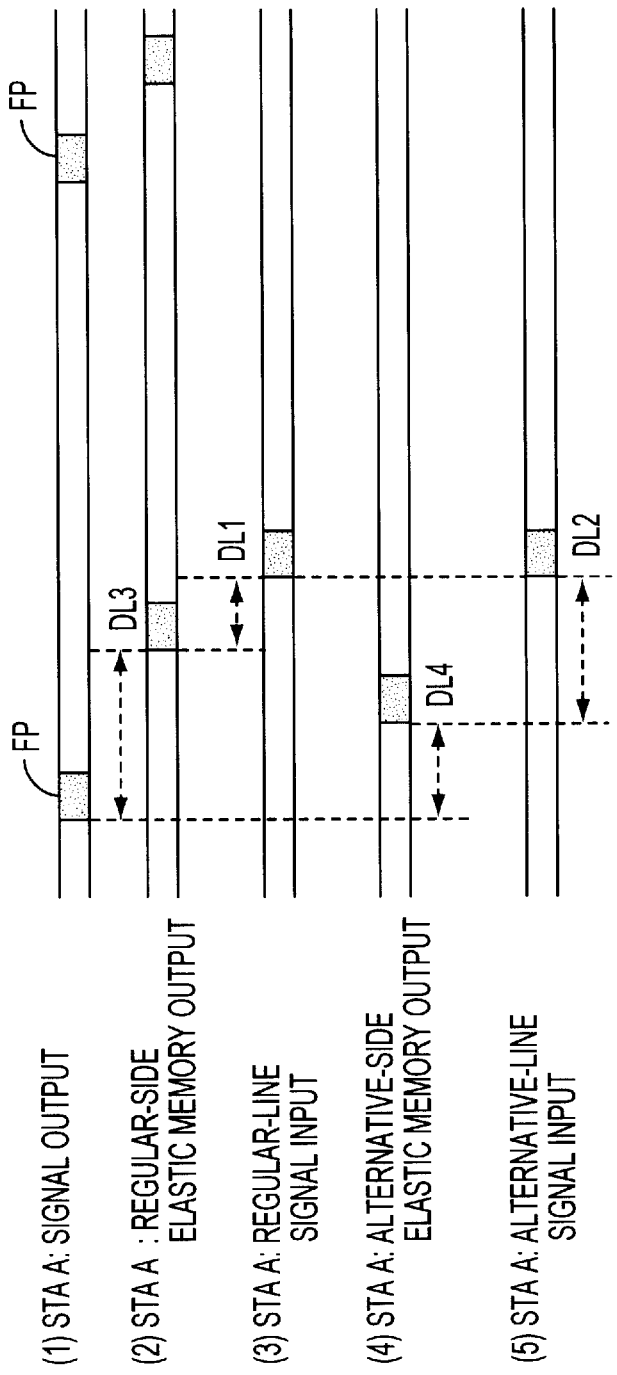

APPARATUS AND A METHOD FOR ESTABLISHING SIGNAL SYNCHRONIZATION BETWEEN LINES

BACKGROUND OF THE INVENTION

1. Field of the Invention

The present invention relates to an apparatus and a method for establishing signal synchronization between transmission lines using the ITU-T-standardized SDH (Synchronous Digital Hierarchy) and the U.S. SONET (Synchronous Optical Network) transmission system, for example. The present invention relates particularly to an apparatus and a method for establishing signal synchronization between transmission lines, prior to switching the lines from a regular line to an alternative line without interrupted, lost or error data (hereinafter called uninterrupted line switching).

Conventionally, control and maintenance information was included in a higher-order-group signal and the line switching was performed at a level of a lower-order group signal. However, to improve the transmission quality of trunk transmission line, it is recently in great demand that the control and maintenance information is included in a higher-order-group signal and that the uninterrupted line switching is performed at a higher-order-group signal level.

2. Description of the Related Art

FIG. 1 is a block diagram illustrating a conventional system for establishing signal synchronization between lines. FIG. 2 is a timing chart illustrating the conventional system for establishing signal synchronization between lines.

In FIG. 1, a regular line is connected from a station A directly to a station B; an alternative line is connected from the station A to the station B via a station C.

A sending terminal equipment of station A is comprised of a frame pulse (FP) inserter and a branch circuit. A transmission signal is separated in two by the branch circuit (BR CKT), which signals are transmitted respectively from station A to station B simultaneously over the regular and alternative lines (hereinafter the signals are called a regular-line signal and an alternative-line signal, respectively).

A receiving terminal equipment of station B is comprised of a controller and a selector; corresponding to the regular line (or on the regular side), a delay circuit (or memory having a fixed storage capacity) and a frame pulse (FP) detector; and corresponding to the alternative line (or on the alternative side), an elastic memory and a frame pulse detector.

Referring to FIG. 2, operations of the conventional signal synchronizing system are explained. In station A, the frame pulse inserter inserts in a transmission signal, a signal of a particular form (hereinafter the signal is called a frame pulse).

(1) The transmission signal including the frame pulse is separated in two by the branch circuit, which signals are transmitted from station A over the regular and alternative lines.

(2) The transmission signal transmitted via the regular line (regular-line signal) reaches station B after a propagation delay DL1 of the regular line.

(3) The transmission signal transmitted via the alternative line (alternative-line signal) reaches station B after a propagation delay DL2 of the alternative line, which is larger than DL1 because the signal passes through station C.

(4) In station B, the delay circuit causes the regular-line signal to delay further than the alternative-line signal does. That is, the delay circuit causes a delay DL3 to the regular-line signal so that the regular-line signal is output from the delay circuit later than the alternative-line signal reaches station B.

The regular-line signal is output from the selector outside the station B via the delay circuit and FP detector provided for the regular line (i.e., on the regular side). The regular-side FP detector detects the frame pulse in the regular-line signal and outputs a detection signal to the controller.

On the other hand, a byte of the incoming alternative-line signal is sequentially stored in the elastic memory and when the memory is full, the signal is read therefrom bytewise in a FIFO fashion every time a byte of the signal is input to the memory. The storage capacity of the elastic memory can be specified dynamically in byte units by the controller. The signal read from the elastic memory is output to the selector through the FP detector. The alternative-side FP detector detects the frame pulse in the incoming signal to output a detection signal to the controller.

The controller determines whether the detection signals occur at the same time from the respective FP detectors. When the determination is negative, the controller delays the data output from the elastic memory by increasing the storage capacity of the elastic memory. The above operation is repeated until both FP detectors output the detection signals at the same time. When the determination is positive, the controller recognizes that the signals on both lines are synchronized. Therefore, the lines can be switched uninterruptedly from the regular to the alternative by controlling the selector so as to select the signal output from the alternative-side frame pulse detector.

As described above, the conventional system delayed the regular-line signal later than the alternative-line signal by previously providing the delay circuit to the regular side, eventually causing an excess delay to the regular-line signal even in the usual operation. To make matters worse, the alternative-line signal is delayed further than the regular-line signal when the lines are switched to the alternative.

Therefore, a problem is that a communication network including stations having such delay is not preferable since the delay is added each time a signal passes through a station, causing undue delay in the entire network.

SUMMARY OF THE INVENTION

It is an object of the present invention to offer an apparatus and a method for establishing signal synchronization between lines, which allows uninterrupted line switching with minimum delay in signal transmission within a communication network.

To achieve the above and other objects, the present invention provides a first separation unit, a first memory unit, a second separation unit and a control unit.

In an apparatus for establishing synchronization between transmission signals output from a signal source and transmitted onto first and second lines, the transmission signals each having a transmission frame, a pointer and multiplexed information multiplexed in a position of the transmission frame specified by the pointer, the first separation unit for detecting the pointer in the transmission signal received from the first line and separating the multiplexed information from the transmission signal based on the pointer. The first memory unit for storing therein the multiplexed information output from the first separation unit, the first memory unit being capable of vary storage capacity thereof as specified, and for reading the information therefrom when a time corresponding to the storage capacity has elapsed after the information is stored therein. The second separation unit for detecting the pointer in the transmission signal received from the second line and separating the multiplexed information from the transmission signal based on the pointer. The control unit for specifying the storage capacity for the first memory unit so that the multiplexed information read from the first memory unit and that output from the second separation unit occur at the same time.

BRIEF DESCRIPTION OF THE DRAWINGS

FIG. 2 is a timing chart illustrating the conventional system for establishing signal synchronization between lines;

FIG. 8 is a timing chart illustrating the operation of the first embodiment of the present invention;

FIG. 9 is a block diagram illustrating the second embodiment of the present invention; and FIG. 10 is a timing chart illustrating the operation of the second embodiment of the present invention.

Throughout the above-mentioned drawings, identical reference numerals are used to designate the same or similar component parts.

DESCRIPTION OF THE PREFERRED EMBODIMENTS

A signal synchronizing device embodying the present invention is described below, referring to figures. The present invention mutually synchronizes signals transmitted on two lines by causing a delay respectively to the lines by use of the pointer of a new transmission system SDH (Synchronous Digital Hierarchy) which is a new synchronization system stipulated as an international standard.

The SDH pointer (i.e., AU pointer, TU pointer), which is a control signal defined in the section overhead (SOH) of the SDH transmission system, specifies the head of the information to be multiplexed in a payload of an SDH transmission frame (hereinafter the information is called multiplexed information). The present invention performs positive and negative stuffing by using this pointer to control the amount of the data transmitted within a transmission frame without causing a data error. Accordingly, the pointer allows multiplexed information (e.g., VC-3) to be transmitted, by dynamically changing (i.e., without fixing) the position where the information is multiplexed in an SDH transmission frame. That is, the amount of data to be transmitted within a transmission frame can be changed flexibly.

The present invention synchronizes signals on different lines by using the characteristics of the pointer. Refer to materials such as the international standard ITU-T G709 for details of SDH transmission system.

The SDH transmission system multiplexes a multiplexed information frame in a transmission frame by specifying the displacement between the frames with an offset which is called a pointer, just as accessing data in a memory by specifying the data address. Therefore, in the synchronous multiplexing processing for establishing frame synchronization every 125 micro-seconds, the SDH transmission system can minimize the delay of multiplexed information being multiplexed, by addressing a time phase difference between the transmission frame and the multiplexed information frame in terms of time slot.

The pointer consisting of three bytes (H1, H2 and H3), is located in the fourth line of the transmission frame (e.g., STM-N frame), in the midst of the section overhead (SOH). The H1 and H2 include a pointer value and control bits for validating the value immediately. The H3 is an action byte for stuffing use as described below. When there exists a slight difference in clock frequency between the transmission frame and the multiplexed information frame, a stuffing operation by using the pointer can prevent the transmission data from being lost.

Figure 1:
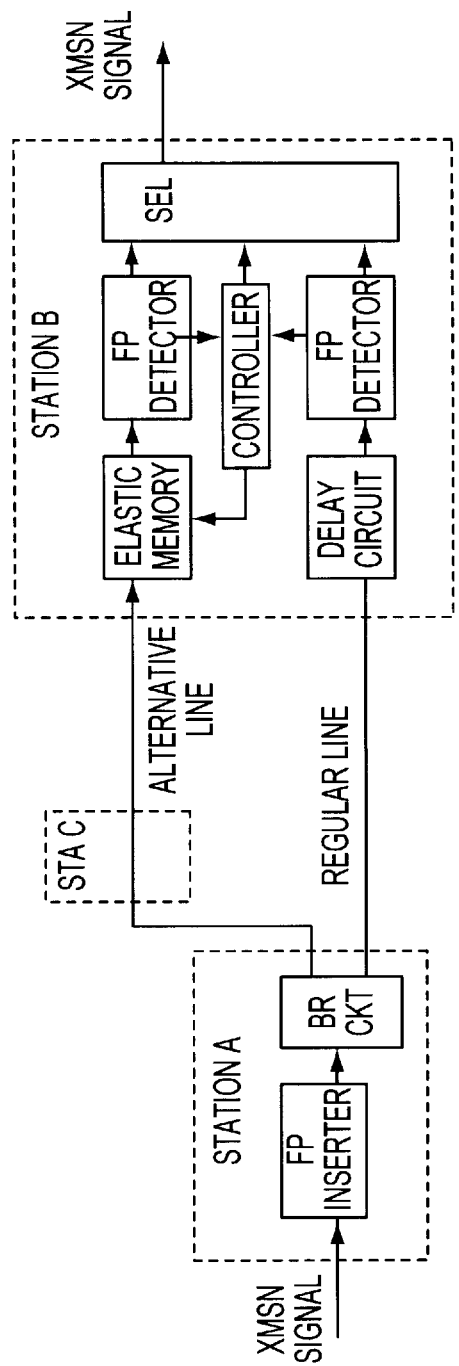
FIG. 1 is a block diagram illustrating a conventional system for establishing signal synchronization between lines.
Figure 3A:
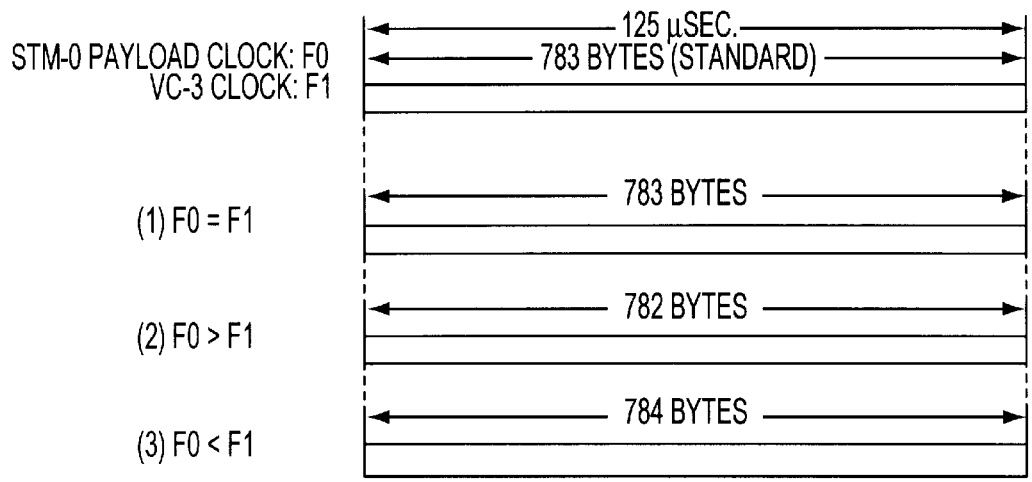
FIG. 3A illustrates relations between the difference in clock frequency and the number of bytes of the VC-3 to be multiplexed in the STM-0 payload.
Figure 3B:
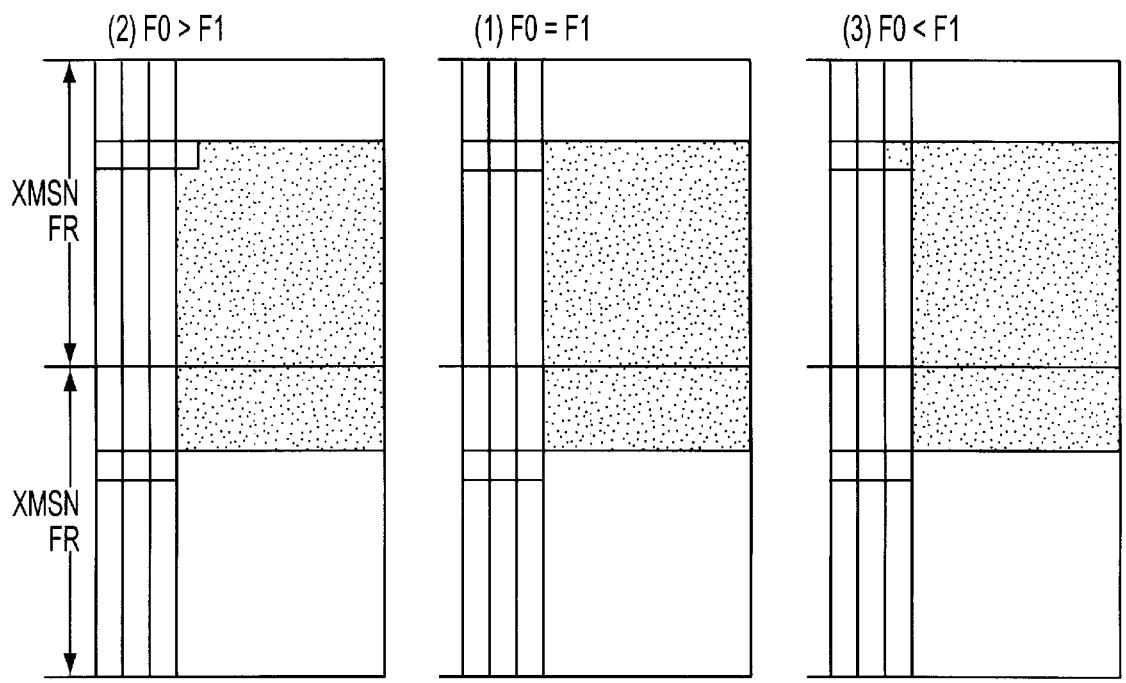
FIG. 3B illustrates the principle of adjusting the difference in clock frequency by using the pointer.

FIG. 3A illustrates relations between the difference in clock frequency and the number of bytes of the VC-3 to be multiplexed in the STM-0 payload. FIG. 3B illustrates the principle of adjusting the difference in clock frequency by using the pointer, in multiplexing the VC-3 in the STM-0 payload. It is assumed that the clock frequency of the STM-0 payload is f0 and that of the VC-3 is f1. Cases (1) f0=f1, (2) f0>f1 and (3) f0<f1 are shown with respect to the standard time of the payload including 783 bytes.

In case (1), stuffing is not performed because the number of bytes (783) of the multiplexed information VC-3 is equal to that (783) of the STM-0 payload. In case (2), since the number of bytes (782) of the VC-3 is one byte less than that (783) of the STM-0 payload, this disagreement is adjusted by adding one to the pointer value and multiplexing the VC-3 in the STM-0 payload with the VC-3 delayed one byte position (positive stuffing). In case (3), since the number of bytes (784) of the VC-3 is one byte more than that (783) of the STM-0 payload, the disagreement is adjusted by subtracting one from the pointer value to increase the number of bytes of the VC-3 to 784 bytes and by multiplexing the VC-3 starting with the H3 byte position (negative stuffing). Thus, a difference in clock frequency between the STM-0 payload and the multiplexed information VC-3 can be resolved. The above is a usual stuffing operation by use of the pointer in the SDH transmission system.

Figures 4A, 4B:
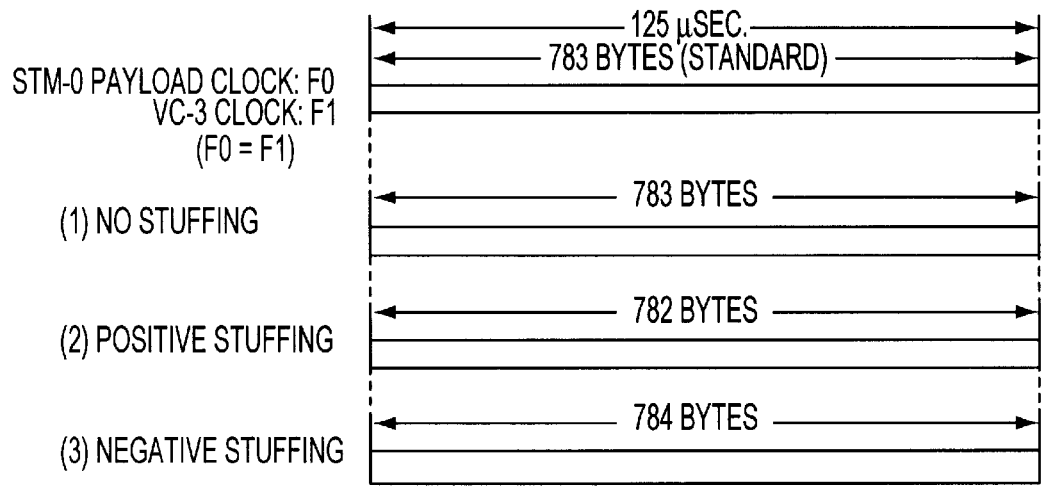
FIG. 4A illustrates relations between stuffing operation and the number of bytes of the VC-3 to be multiplexed in the STM-0 payload.
FIG. 4B is a diagram illustrating the stuffing operation of the present invention by use of the pointer.

The stuffing operation of the present invention by use of the pointer is explained below. FIG. 4A illustrates relations between stuffing operation and the number of bytes of the VC-3 to be multiplexed in the STM-0 payload. FIG. 4B is a diagram illustrating the stuffing operation of the present invention by use of the pointer, in which an example is shown of multiplexing the VC-3 in the STM-0 payload for cases (1) no stuffing, (2) positive stuffing and (3) negative stuffing. The stuffing operation is performed by forcibly operating the pointer irrespective of the difference in clock frequency. Here, it is assumed that f0=f1.

In case (1), the number of bytes (783) of the multiplexed information VC-3 is equal to that (783) of the STM-0 payload. In case (2), a positive stuffing is performed for the STM-0 payload (783 bytes), which causes the amount of information transmitted in 125 micro-seconds to decrease one byte, i.e., the number of bytes of the VC-3 to decrease to 782. Therefore, the one byte which failed to be transmitted in the transmission frame (abbreviated to TMSN FR, e.g., STM-0 frame) is stored in a memory to transmit the VC-3 as 782 bytes. In case (3), a negative stuffing is performed for the STM-0 payload (783 bytes), which causes the amount of information transmitted in 125 micro-seconds to increase one byte, i.e., the number of bytes of the VC-3 to increase to 784. Therefore, one byte which has been stored in the memory is read out and added to the VC-3 to transmit the VC-3 as 784 bytes.

Thus, positive stuffing and negative stuffing can be forcibly performed by controlling the pointer. The present invention delays sending the multiplexed information by accumulating the information bytewise in a memory and increasing the pointer value by one (positive stuffing). It also recovers the delay (caused by the positive stuffing, for example) by discharging the multiplexed information bytewise which was accumulated in the memory and decreasing the pointer value by one (negative stuffing).

Figure 5:
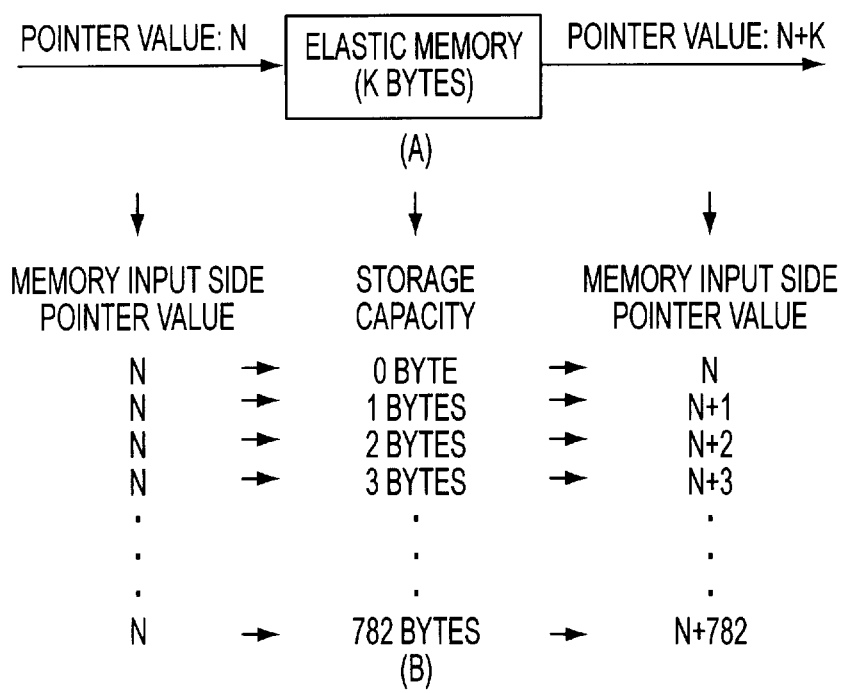
FIG. 5 shows relations between a delay caused to data by the elastic memory and a pointer value.

FIG. 5 shows relations between a delay caused to data by the elastic memory and a pointer value. In FIG. 5-part (A), it is assumed that the pointer value before the data is stored in the memory (i.e., at the input side of the memory) is n. When the data passes through a memory of a storage capacity of k bytes (i.e., when the data is written in the memory and then read therefrom), the data delays k time slots (the time slot is a time required for the k-byte data to be transmitted on the transmission line). Accordingly, the pointer value is required to be increased (updated) to n+k on the memory output side.

FIG. 5-part (B) shows relations between the capacity (k bytes) of the memory the data passes therethrough in FIG. 5-part (A) and the pointer value on the memory output side. Here, the pointer value on the memory input side is assumed to be n. When the data passes through a one-byte memory and is transmitted after a delay of one time slot, the output-side pointer value becomes n+1 (positive stuffing). When the data passes through a two-byte memory and is transmitted after a delay of two time slots, the output-side pointer value becomes n+2. Similarly, when the data passes through a 782-byte memory and is transmitted after a delay of 782 time slots, the output-side pointer value becomes n+782.

Thus, a delay can be caused to the transmission data without a transmission error, by accumulating the data received from the line in the memory and controlling the pointer of SDH transmission system.

Figure 6:
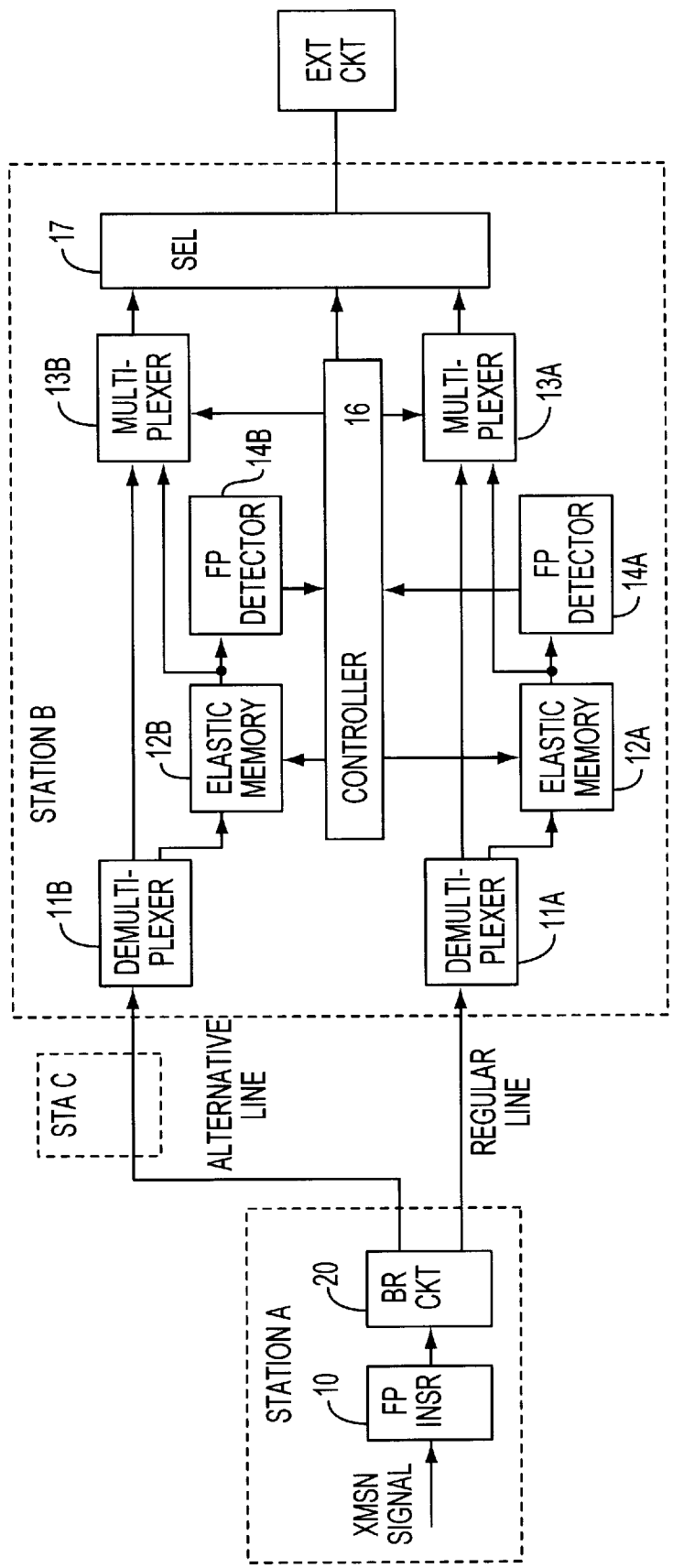
FIG. 6 is a block diagram illustrating the first embodiment of the present invention.

FIG. 6 is a block diagram illustrating the first embodiment of the present invention. A sending terminal equipment of station A is comprised of a frame pulse (FP) inserter 10 and a branch circuit 20. The frame pulse inserter inserts a signal of a particular form (hereinafter called a frame pulse) at a particular position of the Path Overhead (POH) of the multiplexed information (e.g., VC-3), for every predetermined number of transmission frames, for example. The branch circuit 20 transmits the transmission signal including the frame pulse separately onto the regular and the alternative lines.

Station B is comprised of a controller 16 and a selector 17; and corresponding to the regular and alternative lines (or on the regular and alternative sides), demultiplexers (11A, 11B), elastic memories (12A, 12B), multiplexers (13A, 13B) and frame pulse (FP) detectors (14A, 14B), respectively.

The controller 16 controls other functional units so as to accomplish the function of the present invention to establish signal synchronization between the lines. The transmission signal received via the regular and alternative lines are conveyed to the selector 17 via the respective demultiplexers 11A, 11B and multiplexers 13A, 13B.

The demultiplexers 11A, 11B each detect the pointer in the transmission signal, separate the multiplexed information (VC-3 etc.) from the transmission signal based on the pointer (e.g., value n) and pass the information bytewise to the respective elastic memories 12A, 12B. The memories 12A, 12B each store the multiplexed information therein.

The storage capacity of the elastic memories 12A, 12B is dynamically specified in byte units by the controller 16. When the storage capacity is specified for k bytes, for example, the information is read bytewise from the memories 12A, 12B in a FIFO method, k time slots after the information is stored therein. On detecting the frame pulse in the multiplexed information output from the respective elastic memories 12A, 12B, the frame pulse (FP) detectors 14A, 14B each output a detection signal to the controller 16.

The multiplexers 13A, 13B update the pointer (to n+k) of the transmission frame according to the storage capacity (k bytes) of the elastic memories 12A, 12B. Thereafter, they multiplex the multiplexed information read out from the respective elastic memories 12A, 12B, in the position of the transmission frame as specified by the updated pointer.

The controller 16 monitors the detection signals output from the frame pulse detectors 14A, 14B and checks to see whether the signals occur at the same time. When the signals occur at the same time, the controller 16 recognizes that the respective multiplexed information that has passed through the elastic memories 12A, 12B are synchronized and controls the selector 17 so as to select the transmission signal coming from the alternative-side multiplexer 13B, thus switching the lines from the regular to the alternative. Since the transmission signals are switched after they are synchronized in this way, the uninterrupted line switching can be realized without interrupted, lost and error data.

Figure 7:
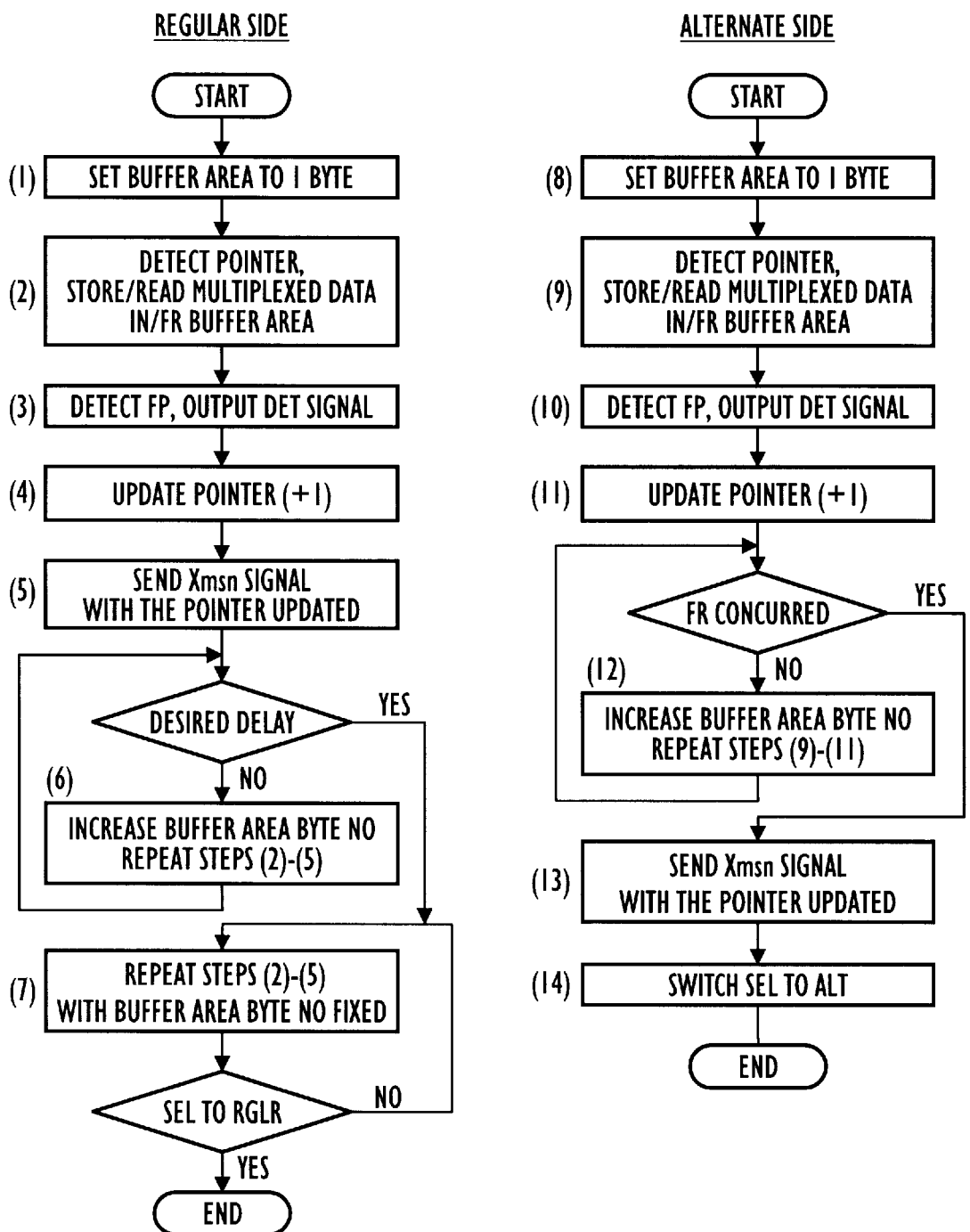
FIG. 7 is a flowchart illustrating an operation of the first embodiment of the present invention.

FIG. 7 is a flowchart illustrating an operation of the first embodiment of the present invention. In the sending station (station A), the FP inserter 10 inserts a frame pulse in one of a series of the transmission frames (simply called a transmission signal). The branch circuit 20 outputs the transmission signal having the frame pulse inserted, in parallel onto the regular and alternative lines.

The operation in receiving station (station B) is explained based on FIG. 7 and referring to FIG. 6.

(1) On the regular side, the controller 16 firstly sets the capacity of the elastic memory 12A to one byte.

(2) The demultiplexer 11A detects the pointer in the received transmission signal, separates the multiplexed information (e.g., VC-3) based on the pointer and passes the information byte by byte to the elastic memory 12A. The elastic memory 12A stores the byte in the buffer area thereof and when the buffer area is full, reads the information bytewise therefrom every time a byte of the multiplexed information comes from the demultiplexer 11A and outputs the read byte to the frame pulse detector 14A and multiplexer 13A. Accordingly, the multiplexed information is read from the elastic memory 12A one time slot after it is received from the line. That is, when passing through the elastic memory 12A, the multiplexed information is delayed by a time slot corresponding to the storage capacity (the number of bytes) of the buffer area.

(3) The frame pulse detector 14A monitors the frame pulse in the multiplex information and when detecting the pulse, outputs a detection signal to the controller 16.

(4) The multiplexer 13A updates the pointer by adding one to the current pointer value and multiplexes the multiplexed information coming from the elastic memory 12A in the position of the transmission frame as specified by the updated pointer to form a transmission signal and conveys the signal to the selector 17.

(5) The controller 16 outputs the transmission signal to an external unit (e.g., a multiplex device and a crossconnect device) via the selector 17. Thus, the multiplexed information is output to the external unit, delayed by the time slots corresponding to the capacity of the buffer area.

(6) Unless the delay determined by the capacity of the buffer area reaches a desired time, the above steps (2)–(5) are repeated while increasing the capacity of the buffer area, byte by byte. Thus, the delay of multiplexed information and the pointer value increase as the capacity increases.

(7) When the delay reaches the desired value, the capacity of the buffer area and the pointer value are fixed to the current value, and the above steps (2)–(5) are repeated until the alternative side is selected by the selector 17.

(8) The operation of the alternative side is executed while the operation of step (7) on the regular side is in process. First, the controller 16 sets the storage capacity of the buffer area of the elastic memory 12B to one byte.

(9) The demultiplexer 11B detects the pointer in the received transmission signal, separates the multiplexed information based on the pointer and conveys the information bytewise to the elastic memory 12B. The elastic memory 12B stores the input byte in the buffer area and when the buffer area is full, reads the information bytewise from the buffer area and outputs the byte to the frame pulse detector 14B and multiplexer 13B, every time a byte of the multiplexed information is input from the demultiplexer 11B. Therefore, the multiplexed information is read from the elastic memory 12B one time slot after it is received from the line by station B. That is, after passing through the elastic memory 12B, the multiplexed information is delayed by a time slot corresponding to the capacity of the buffer area.

(10) The frame pulse detector 14B monitors the frame pulse in the multiplexed information and when detecting the pulse, outputs a detection signal to the controller 16.

(11) The multiplexer 13B updates the pointer by adding one to the current pointer value.

(12) The controller 16 continuously monitors the detection signals output from the frame pulse detectors 14A, 14B. The operation of the above steps (9)–(10) are repeated with the capacity of the buffer area increasing byte by byte until both detection signals occur at the same time. Accordingly, the delay of the multiplexed information and the pointer value increase as the capacity of the buffer area increases.

(13) When the detection signals occur at the same time, the controller 16 recognizes that the respective multiplexed information coming from the elastic memory 12A, 12B are synchronized. Then it controls the alternative-side multiplexer 13B so as to multiplexes the multiplexed information coming from the elastic memory 13B in the position of the transmission frame as specified by the updated pointer to form a transmission signal and outputs the transmission signal to the selector 17.

(14) The selector 17 selects the transmission signal from the alternative side. Thus, uninterrupted line switch can be achieved by switching from the regular-line signal to the alternative-line signal when the regular- and alternative-sides multiplexed information are synchronized with each other. If necessary, the delay caused to the alternative side can be recovered afterward, by gradually decreasing the buffer-area capacity of elastic memory 12B and decreasing the pointer value through the negative stuffing.

FIG. 8 is a timing chart illustrating the operation of the first embodiment of the present invention. The operation is explained, referring to FIG. 8 and paying attention to the frame pulse (FP).

(1) In station A, the transmission signal with the frame pulse inserted in the multiplexed information by the FP inserter 10 is transmitted simultaneously from the branch circuit 20 onto the regular and alternative lines.

(2) The transmission signal including the frame pulse reaches station B via the regular line after a propagation delay of DL1.

(3) The same transmission signal reaches station B via the alternative line after a propagation delay of DL2 (including a delay in station C).

(4) As shown in the operation on the regular side in FIG. 7, the multiplexed information is delayed in station B by increasing the buffer-area capacity of the regular-side elastic memory 12A. This operation is repeated until the desired delay is obtained. Also, the pointer value is increased as the capacity is increased.

(5) In the same way, the multiplexed information is delayed by gradually increasing the buffer-area capacity of alternative-side elastic memory 12B and the pointer value. This operation is repeated until the frame pulses occur at the same time from the regular and alternative sides. When the frame pulses are detected at the same time, indicating that the multiplexed information on both lines are mutually synchronized, uninterrupted line switching can be achieved by switching the lines from the regular to the alternative.

FIG. 9 is a block diagram illustrating the second embodiment of the present invention. A sending terminal equipment of station A is comprised of demultiplexer 31, a frame pulse inserter (FP INSR) 20 and a controller 36; and on the regular and alternative sides, elastic memories (22A, 22B) and multiplexers (23A, 23B), respectively. A receiving terminal equipment of station B is comprised of a controller 26 and a selector 27; on the regular and alternative sides, demultiplexers (21A, 21B) and frame pulse (FP) detectors (24A, 24B), respectively.

The second embodiment is so constructed that a part of the functional units of the receiving side (station B) of the first embodiment is transferred to the sending side (station A). Therefore, the functions of the functional units of the second embodiment are similar to those of the counterparts of the first embodiment.

In station A, the elastic memory 22A causes a delay to the multiplexed information of the regular-line signal by increasing its storage capacity such that the information is stored therein and read out therefrom later than that of the alternative-line signal reaches station B. The multiplexer 23A updates to the pointer based on the capacity and multiplexes the information as specified by the updated pointer. In station B, the demultiplexers 21A, 21B each detect the pointer in the regular- and alternative-line signals and separate the multiplexed information based on the pointer. When detecting a frame pulse in the multiplexed information, the frame pulse detectors 24A, 24B each output a detection signal to the controller 26.

The receiving-side controller 26 sends a match/mismatch signal to the sending-side controller 36 depending on whether the detection signals occur at the same time. On receipt of the mismatch signal, the sending-side controller 26 controls the alternative-side elastic memory 22B and multiplexer 23B so as to cause a delay to the multiplexed information relative to the transmission signal by increasing the storage capacity and to update the pointer accordingly. This operation is repeated until the controller 26 receives the match signal from station B. After sending the match signal, the receiving-side controller 26 can switch uninterruptedly the regular line to the alternative line by controlling the selector 27.

FIG. 10 is a timing chart illustrating the operation of the second embodiment of the present invention. The operation of the second embodiment is explained, referring to FIG. 10 and paying attention to the frame pulse (FP).

(1) In station A, a frame pulse (FP) is inserted in the multiplexed information. The information is output simultaneously to the regular- and the alternative-lines.

(2) On the regular side of station A, under control of the elastic memory 22A and multiplexer 23A, a delay DL3 is caused to the multiplexed information and the pointer is updated according to the delay DL3. The transmission signal having the multiplexed information delayed and pointer updated is transmitted on the regular line.

(3) The transmission signal reaches station B after a propagation delay DL1 of the regular line.

(4) On the alternative side of station A, under control of the elastic memory 22B and the multiplexer 23B, a delay DL4 is caused increasingly to the multiplexed information and the pointer is updated according to the delay DL4 to form an alternative-line signal. This operation is repeated until the match signal is received from station B.

(5) In station B, the above-alternative-line signal reaches station B after a propagation delay DL2 of the alternative line (including a delay in station C). The controller 26 of station B sends the match/mismatch signal to station A, indicating whether or not the frame pulses on both sides occur simultaneously.

Station A repeats the operation of the above step (4) to increase the delay DL4 until the match signal is received. After detecting the frame pulse occurring simultaneously, the controller 26 of station B causes the selector 27 to switch the lines from the regular to the alternative.

When it is known previously that the propagation delay of the regular line is smaller than that of the alternative line as in the above example, signal synchronization can be established by performing positive stuffing only on the regular side to delay the regular-side multiplexed information as late as that of the alternative side. That is, positive stuffing can be omitted for the alternative side and therefore, the alternative-side elastic memory 12B and multiplexer 13B can be omitted.

As described above, the present invention employs the elastic memory and the SDH pointer function on both regular and alternative sides and performs stuffing to cause a delay to the multiplexed information on both sides. Therefore, a delay circuit for causing a delay larger than the propagation delay of the alternative line need not be caused previously to the regular line at the time a communication system is opened, as was the case with the conventional system. Accordingly, synchronization can easily be established with a minimum delay, regardless of the differences in propagation delay between the regular and alternative lines.

Also, since the delay caused in the station can be recovered by performing negative stuffing after the lines are switched, a high-quality network having a minimum delay can be constructed. Moreover, a flexible network can be constructed since the stuffing operation is possible on both sides, which allows uniform operations to establish the signal synchronization on both regular and alternative lines, regardless of the above-mentioned delay differences.

What is claimed is:

1. An apparatus for establishing synchronization between transmission signals output from a signal source and transmitted via first and second lines, the transmission signals each having a transmission frame, a pointer and multiplexed information multiplexed in a position of the transmission frame specified by the pointer, said apparatus comprising:

a first separation unit for detecting the pointer in the transmission signal received from the first line and separating the multiplexed information from the transmission signal based on the pointer;

a first memory unit for storing therein the multiplexed information output from said first separation unit, said first memory unit being capable of varying storage capacity thereof as specified reading the information therefrom when a time corresponding to the storage capacity has elapsed after the information is stored therein;

a second separation unit for detecting the pointer in the transmission signal received from the second line and separating the multiplexed information from the transmission signal based on the pointer; and a control unit for specifying the storage capacity for said first memory unit so that the multiplexed information read from said first memory unit and that output from said second separation unit occur at the same time.

2. An apparatus according to claim 1, wherein said apparatus further comprises an insertion unit for inserting an identification signal in the multiplexed information of the signal output from the signal source; and wherein control unit specifies the storage capacity so that the identification signal read from said first memory unit and that output from said second separation unit are detected at the same time.

3. An apparatus according to claim 1, wherein said apparatus further comprises a second memory unit for storing therein the multiplexed information output from said second separation unit, said second memory unit being capable of varying storage capacity thereof as specified and reading the information therefrom when a time corresponding to the storage capacity has elapsed after the information is stored therein; and wherein said control unit specifies the storage capacity of said first and second memory units so that the multiplexed information read from said first and second memory units occur at the same time.

4. An apparatus according to claim 3, wherein said apparatus further comprises an insertion unit for inserting an identification signal in the multiplexed information of the signal output from the signal source; and wherein control unit specifies the storage capacity so that the identification signals read from said first and second memory units are detected at the same time.

5. An apparatus for establishing synchronization between transmission signals output from a signal source and transmitted via first and second lines, the transmission signals each having a transmission frame, a pointer and multiplexed information multiplexed in a position of the transmission frame specified by the pointer, said apparatus comprising:

a first memory unit for storing therein the multiplexed information of the transmission signal, said first memory unit being capable of varying storage capacity thereof as indicated and reading the information therefrom when a time corresponding to the storage capacity has elapsed after the information is stored therein;

a first multiplexing unit for updating the pointer according to the storage capacity of said first memory unit and multiplexing the multiplexed information read from said first memory unit in a position of the transmission frame based on the updated pointer to form a transmission signal to be transmitted on the first line;

a first separation unit for detecting the pointer in the transmission signal received from the first line and separating the multiplexed information from the transmission signal based on the pointer;

a second separation unit for detecting the pointer in the transmission signal output from the signal source and received from the second line and separating the multiplexed information from the transmission signal based on the pointer; and a indication unit for indicating said first memory unit to vary the storage capacity so that the multiplexed information output from said first and second separation units occur at the same time.

6. An apparatus according to claim 5, wherein said apparatus further comprises an insertion unit for inserting an identification signal in the multiplexed information of the signal output from the signal source; and wherein said indication unit indicates said first memory unit to vary the storage capacity and said first multiplexing unit to update the pointer so that the identification signals output from said first and second separation units are detected at the same time.

7. An apparatus according to claim 6, wherein said apparatus further comprises:

a second memory unit for storing therein the multiplexed information of the transmission signal, said second memory unit being capable of varying storage capacity thereof as indicated and reading the information therefrom when a time corresponding to the storage capacity has elapsed after the information is stored therein; and a second multiplexing unit for updating the pointer according to the storage capacity of said second memory unit and multiplexing the multiplexed information read from said second memory unit in a position of the transmission frame based on the updated pointer to form a transmission signal to be transmitted on the second line; and wherein said indication unit indicates said first and second memory units to vary the storage capacity so that the multiplexed information output from said first and second separation units occur at the same time.

8. An apparatus according to claim 7, wherein said apparatus further comprises an insertion unit for inserting an identification signal in the multiplexed information of the signal output from the signal source; and wherein said indication unit indicates said first and second memory units to vary the storage capacity and said first and second multiplexing units to update the pointer so that the identification signals output from said first and second separation units are detected at the same time.

9. An apparatus for establishing synchronization between transmission signals output from a signal source and transmitted via first and second lines, the transmission signals each having a transmission frame, a pointer and multiplexed information multiplexed in a position of the transmission frame specified by the pointer, said apparatus comprising:

an insertion unit for inserting an identification signal in the multiplexed information of the signal output from the signal source;

a first separation unit for detecting the pointer in the transmission signal received from the first line and separating the multiplexed information from the transmission signal based on the pointer;

a first memory unit for storing therein the multiplexed information output from said first separation unit, said first memory unit being capable of varying storage capacity thereof as specified and reading the information therefrom when a time corresponding to the storage capacity has elapsed after the information is stored therein;

a first detection unit for outputting a first detection signal when detecting the identification signal in the multiplexed information output from said first memory unit;

a first multiplexing unit for updating the pointer according to the storage capacity of said first memory unit and multiplexing the multiplexed information in a position of the transmission frame as specified by the updated pointer to form a transmission signal;

a second separation unit for detecting the pointer in the transmission signal output from the signal source and received from the second line and separating the multiplexed information from the transmission signal based on the pointer;

a second detection unit for outputting a second detection signal when detecting the identification signal in the multiplexed information output from said second separation unit; and a control unit for specifying the storage capacity of said first memory unit so that the first and second detection signals occur at the same time and for selecting one of the transmission signal formed by said first multiplexing unit and that received from the second line to transmit to an external device.

10. An apparatus according to claim 9, wherein said apparatus further comprises:

a second memory unit for storing therein the multiplexed information output from said second separation unit, said second memory unit being capable of varying storage capacity thereof as specified and reading the information therefrom when a time corresponding to the storage capacity has elapsed after the information is stored therein; and a second multiplexing unit for updating the pointer according to the storage capacity of said second memory unit and multiplexing the multiplexed information in a position of the transmission frame as specified by the updated pointer to form a transmission signal, and wherein said second detection unit outputs the second detection signal when detecting the identification signal in the multiplexed information output from said second memory unit, and said control unit specifies the storage capacity of said first and second memory units so that the first and second detection signals occur at the same time and selects one of the transmission signals output by said first and second multiplexing units, respectively to transmit to an external device.

11. An apparatus according to claim 10, wherein said control unit specifies a decreasing storage capacity for at least one of said first and second memory units after said control unit has selected one of the transmission signals.

12. An apparatus for establishing synchronization between transmission signals output from a signal source and transmitted via first and second lines, the transmission signals each having a transmission frame, a pointer and multiplexed information multiplexed in a position of the transmission frame specified by the pointer, said apparatus comprising:

an insertion unit for inserting an identification signal in the multiplexed information of the signal output from the signal source;

a first memory unit for storing therein the multiplexed information output from said insertion unit, said first memory unit being capable of varying storage capacity thereof as indicated and reading the information therefrom when a time corresponding to the storage capacity has elapsed after the information is stored therein;

a first multiplexing unit for updating the pointer according to the storage capacity of said first memory unit and multiplexing the multiplexed information read from said first memory unit in a position of the transmission frame based on the updated pointer to form a transmission signal to be transmitted onto the first line;

a first control unit, based on a mismatch signal, for indicating said first memory unit to vary the storage capacity;

a first separation unit for detecting the pointer in the transmission signal received from the first line and separating the multiplexed information from the transmission signal based on the pointer;

a first detection unit for outputting a first detection signal when detecting the identification signal in the multiplexed information output from said first separation unit;

a second separation unit for detecting the pointer in the transmission signal received from the second line and separating the multiplexed information from the transmission signal based on the pointer;

a second detection unit for outputting a second detection signal when detecting the identification signal in the multiplexed information output from said second detection unit; and a second control unit for outputting a mismatch signal when the first and second detection signals do not occur at the same time.

13. An apparatus according to claim 12, wherein said apparatus further comprises:

a second memory unit for storing therein the multiplexed information output from said insertion unit, said second memory unit being capable of varying storage capacity thereof as indicated and reading the information therefrom when a time corresponding to the storage capacity has elapsed after the information is stored therein; and a second multiplexing unit for updating the pointer according to the storage capacity of said second memory unit and multiplexing the multiplexed information read from said second memory unit in a position of the transmission frame based on the updated pointer to form a transmission signal to be transmitted onto the second line; and p2 wherein first control unit, based on a mismatch signal, indicates said first and second memory units to vary the storage capacity and selects one of the transmission signals output by said first and second separation units, respectively to transmit to an external device.

14. An apparatus according to claim 13, wherein said control unit indicates at least one of said first and second memory units to decrease the storage capacity after said first control unit has selected one of the transmission signals.

15. A method for establishing synchronization between transmission signals output from a signal source and transmitted via first and second lines, the transmission signals each having a transmission frame, a pointer and multiplexed information multiplexed in a position of the transmission frame specified by the pointer, said method comprising the steps of:

(a) inserting an identification signal in the multiplexed information;

(b) detecting the pointer in the transmission signal received from the first line and separating the multiplexed information from the transmission signal based on the pointer;

(c) providing a first memory unit for storing therein the multiplexed information separated in step (b), the first memory unit being capable of varying storage capacity thereof as specified and reading the information therefrom when a time corresponding to the storage capacity has elapsed after the information is stored therein;

(d) detecting the pointer in the transmission signal received from the second line and separating the multiplexed information from the transmission signal based on the pointer; and (e) specifying the storage capacity of so that the identification signal from in step (c) and that of the multiplexed information separated in step (d) occur at the same time.

16. A method according to claim 15, wherein the method further comprises (f) providing a second memory unit for storing therein the multiplexed information separated in step (d), the first memory unit being capable of varying storage capacity thereof as specified and reading the information therefrom when a time corresponding to the storage capacity has elapsed after the information is stored therein, and wherein said specifying in step (e) specifies the storage capacity of so that the identification signal of the multiplexed information read from the first memory unit and that of the multiplexed information read from the second memory unit occur at the same time.

17. A method for establishing synchronization between transmission signals output from a signal source and transmitted via first and second lines, the transmission signals each having a transmission frame, a pointer and multiplexed information multiplexed in a position of the transmission frame specified by the pointer, said method comprising the steps of:

(a) inserting an identification signal in the multiplexed information output from the signal source;

(b) providing a first memory unit for storing therein the multiplexed information of the transmission signal, the first memory unit being capable of varying storage capacity thereof as indicated and reading the information therefrom when a time corresponding to the storage capacity has elapsed after the information is stored therein;

(c) updating the pointer according to the storage capacity of the first memory unit and multiplexing the multiplexed information read from the first memory unit in a position of the transmission frame based on the updated pointer to form a transmission signal to be transmitted on the first line;

(d) detecting the pointer in the transmission signal received from the first line and separating the multiplexed information from the transmission signal based on the pointer;

(e) detecting the pointer in the transmission signal output from the signal source and received from the second line and separating the multiplexed information from the transmission signal based on the pointer; and (f) indicating the first memory unit to vary the storage capacity so that the identification signals of the multiplexed information separated in steps (d) and (e) occur at the same time.

18. A method according to claim 17, wherein said method further comprises the steps of:

(g) providing a second memory unit for storing therein the multiplexed information of the transmission signal, the second memory unit being capable of varying storage capacity thereof as indicated and reading the information therefrom when a time corresponding to the storage capacity has elapsed after the information is stored therein; and (h) updating the pointer according to the storage capacity of the second memory unit and multiplexing the multiplexed information read from the second memory unit in a position of the transmission frame based on the updated pointer to form a transmission signal to be transmitted on the second line; and wherein said indicating in step (f) indicates the first and second memory units to vary the storage capacity so that the identification signals of the multiplexed information separated in steps (d) and (e) occur at the same time.

* * * * *